J. ROTH.
Apparatus for Fish Culture.
No. 166,413.
Patented Aug. 3, 1875.
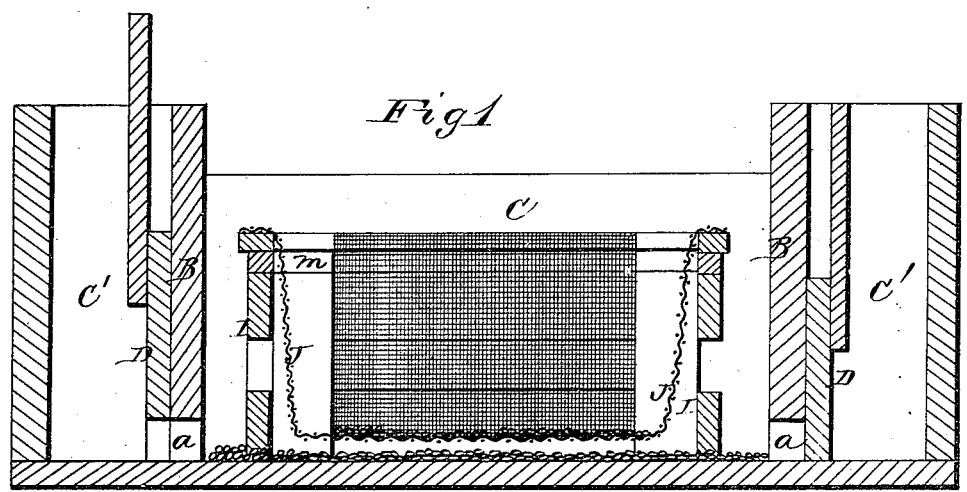
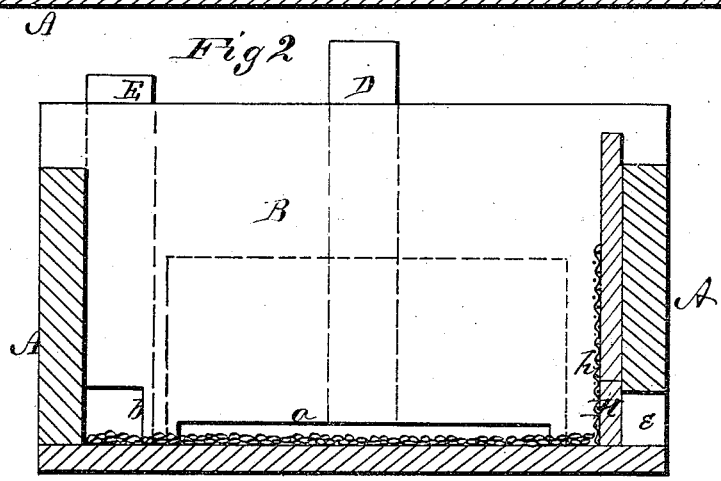
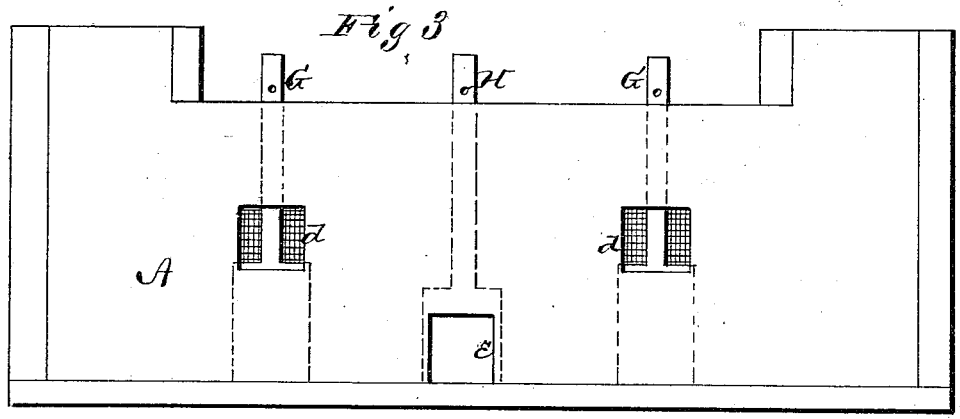
WITNESSES
F. L. Ourand
C. L. Everk
INVENTOR
John Roth
per Alexander H Mason
ATTORNEYS

UNITED STATES PATENT OFFICE.

JOHN ROTH, OF DUNCANNON, PENNSYLVANIA, ASSIGNOR TO STEWART & YOUNG, OF SAME PLACE.

IMPROVEMENT IN APPARATUS FOR FISH CULTURE.

Specification forming part of Letters Patent No. 166,413, dated August 3, 1875; application filed January 25, 1875.

*To all whom it may concern:*

Be it known that I, JOHN ROTH, of Duncannon, in the county of Perry, and in the State of Pennsylvania, have invented certain new and useful Improvements in Fish Culture; and do hereby declare that the following is a full, clear, and exact description thereof, reference being had to the accompanying drawings, and to the letters of reference marked thereon, making a part of this specification.

The nature of my invention consists in the construction and arrangement of an apparatus for hatching fish, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my apparatus. Fig. 2 is a transverse vertical section, and Fig. 3 a side elevation of the same.

A represents a box of any suitable dimensions, provided near each end with vertical partitions B, which divide the box into a large center compartment, C, and two small end compartments, C' C'. These latter are made higher than the middle compartment, and each partition B is provided with an opening, a, at the bottom, which is closed by means of a gate, D. There is also another aperture, b, in each partition at the bottom closed by a gate, E. The two openings b in the two partitions B B are not opposite each other, but one is situated at the front and the other at the rear of the box. In the front of the box are two apertures, d d, at a suitable distance above the bottom, and said apertures are closed, or partially closed, by raising gates G G, as shown in Fig. 3. There is also an opening, e, in the front of the box at the bottom, which opening is closed by a gate, H. In the center compartment C is placed an open frame-work, I, in which is placed a wire basket, J. The bottom of the compartment C and bottom of wire-cloth basket J are covered with fine gravel. The openings d d and e in the front of the box A are covered on the inside with wire-cloth h, to prevent the egress of the young fish.

The fish-eggs are placed in the basket J, which may be elevated to any suitable height by means of separate bars m placed on the frame I. The box is then placed under a mill-race, dam, or other suitable location, where the water can enter the compartments C' in the ends of the box, and create pressure therein. The water is then admitted into the compartment C through one or both openings a, or one or both openings b, by raising the respective gates; and the water may be held in said center compartment at any desired height by means of the gates G.

By these devices any desired motion of the water may be obtained to work the eggs to the best advantage.

When desired to draw off the water in the compartment C, the gate H is raised, and the gates D E closed.

Having thus fully described my invention, what I claim as new, and desire to secure by Letters Patent, is—

1. The box A, divided by partitions B B into compartments C and C' C', and provided with the water-inlets a a and b b, and outlets d d and e, with their respective gates, substantially as and for the purposes herein set forth.

2. In combination with the subject-matter of the above claim, the frame-work I and adjustable wire-cloth basket J, for the purposes herein set forth.

In testimony that I claim the foregoing I have hereunto set my hand this 19th day of January, 1875.

JOHN ROTH.

Witnesses:
 H. A. HALL,
 C. L. EVERT.